United States Patent
Snyder

[11] 3,792,459
[45] Feb. 12, 1974

[54] CONVEYOR BELT RIP DETECTOR

[76] Inventor: Frank D. Snyder, 715 W. Market, Akron, Ohio 44308

[22] Filed: Mar. 20, 1972

[21] Appl. No.: 235,915

[52] U.S. Cl.................. 340/259, 198/232, 307/219
[51] Int. Cl...................... B65g 43/02, G08b 21/00
[58] Field of Search............ 340/259, 258 C, 248 R; 198/232; 307/219, 204

[56] References Cited
UNITED STATES PATENTS

| | | | |
|---|---|---|---|
| 3,731,113 | 5/1973 | Lowe et al. | 340/259 |
| 3,651,506 | 3/1972 | Olaf et al. | 340/259 |
| 3,656,137 | 4/1972 | Ratz | 340/259 |
| 3,305,735 | 2/1967 | Moreines | 307/219 |
| 3,095,783 | 7/1963 | Flindt | 340/248 R |

Primary Examiner—John W. Caldwell
Assistant Examiner—Glen R. Swann, III
Attorney, Agent, or Firm—W. A. Shira, Jr.

[57] ABSTRACT

A plurality of longitudinally spaced conductors is embedded in a non-metallic endless conveyor belt with each conductor extending transversely the width of the belt. A stationary signal generator is disposed along one edge of the belt and capacitively coupled to induce a signal in each of the conductors as they pass the signal generator. A stationary detector is disposed along the edge of said belt on the side opposite the signal generator at the same longitudinal station as the signal generator. The detector is electrically capacitively coupled to detect the signal in the passing conductor and detect a belt rip due to a discontinuity in the conductor. The detector is operatively connected to deactivate the conveyor drive mechanism and to activate a light or other alarm.

10 Claims, 4 Drawing Figures

CONVEYOR BELT RIP DETECTOR

BACKGROUND OF THE INVENTION

In large endless conveyor belts of the type having a non-metallic body installation where the conveyor is used to carry bulk material which is rough or jagged, as, for example, rocks or ore, it is common experience to encounter rips in the belt caused by the jagged bulk material or foreign objects being dropped onto the conveyor at the loading station. If a rip is caused in the conveyor belt and the rip progresses a great enough distance longitudinally along the belt, the belt may be damaged severely enough to require replacement of a large section of the belt or the entire belt may require replacement. In view of the large initial cost of long conveyor belts, it is quite necessary to have some means of detecting formation of a rip at an early stage. Furthermore, if the rip progresses to a sufficient length along the conveyor belt, rupture of the belt may occur and the conveyor belt will become jammed in the drive mechanism.

Thus, it has long been desirable to find some means of early detection of the occurrence of a rip in a large conveyor belt. Previously, various mechanical and electrical expedients have been employed, as, for example, attaching metal members to the edge of the conveyor belt to activate a magnetic detector or embedding metal bars transversely in the conveyor belting during construction of the belting in order to provide resistance to belt ripping. However, these techniques have proven generally unsuccessful in that the magnetic detectors are often disturbed or confused by foreign objects on the conveyor belt. The expedient of embedding metal bars into the belt to prevent longitudinal progression of belt rips requires that the belting be increased in thickness to accept the metal bars. Increasing the belt thickness not only adds to the bulk, weight and initial cost of a conveyor belt, but, furthermore, it tends to decrease flexibility of the belt over the drive rollers and drastically reduces transverse flexibility for troughing over the idlers.

SUMMARY OF THE INVENTION

The present invention provides a solution to the above-described problem of providing a means for detecting the occurrence or rips in large endless, non-metallic conveyor belts. The invention uses a plurality of single electrical conductors embedded in the belt in longitudinally spaced stations along the belt with each conductor extending transversely substantially the width of the belt. A stationary electrical signal generator is provided along one edge of the belt and the generator has its output connected to a transmitter plate spaced closely adjacent the under surface of the belt. As the belt moves over the transmitter plate signal generator electrical signal charge is capacitively induced in each of the conductors as they pass in sequence over the transmitter plate. A detector plate is provided in a stationary location along the opposite edge of the belt from the signal generator. The detector plate is connected to a suitable electrical circuit and is also capacitively coupled to each of the conductors as they pass over the detector plate. The electrical signal charge induced in each of the unbroken conductors is thus detected by the detector plate. A broken conductor wire, however, results in the detector sensing no signal charge. The detector circuit is such that elapse of a predetermined length of time, corresponding to passage of a given number of broken wire conductors, without producing a signal in the detector plate, causes activation of an alarm and/or deactivation of the conveyor belt drive mechanism.

The present invention thus provides a unique solution to the problem of providing a conveyor belt rip detector by employing small spaced, unconnected wire conductors embedded in the belt which conductors are easily fabricated into the belt at a very minimum cost. Furthermore, the conductors do not require an appreciable increase in the bulk or weight of the conveyor belt nor do they cause any significant decrease in the flexibility of the conveyor belt.

DETAILED DESCRIPTION

Figure 1:
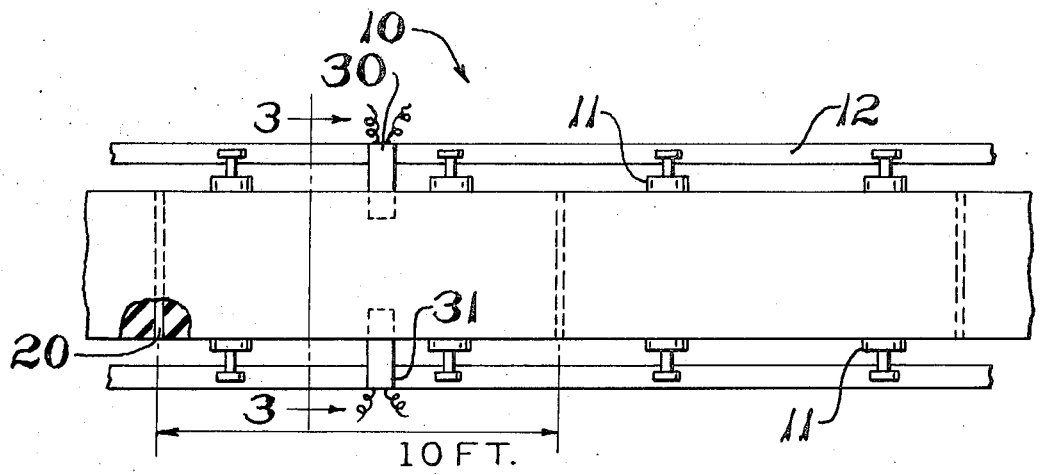
FIG. 1 is a schematic plan view of a portion of a conveyor belt traveling over support rollers and shows in dashed line the conductors embedded in the belt, and illustrates the position of the signal generator transmitter plate and the detector plate.

Referring now to FIG. 1, an endless, non-metallic conveyor belt 10 is shown as being supported over rollers 11 mounted at longitudinal stations along a support frame 12. The conveyor has a plurality of single conductors 20, preferably stranded wire, embedded in the belting at longitudinally spaced locations therealong, with each of the conductors extending transversely substantially the width of the belt. The conductors may also be of a flat strip configuration of solid electrically conductive material other than stranded wire. In the presently preferred practice of the invention, the wire conductors are spaced at intervals of 9 10 feet along the conveyor belt; however, depending upon the size of the belting and the speed of the belt, it may be desirable to space the conductors 20 at shorter or longer intervals along the belt. The criteria governing the spacing of the conductors 20 along the belt is generally the speed of the belt. The conductors should be spaced such that, for a given belt speed, the passage of two conductors will occur in a convenient length of time suitable for the detection circuitry. Preferably, the conductors 20 are placed between the belt carcass and the cover on the inner periphery of the endless belt.

Figure 2:
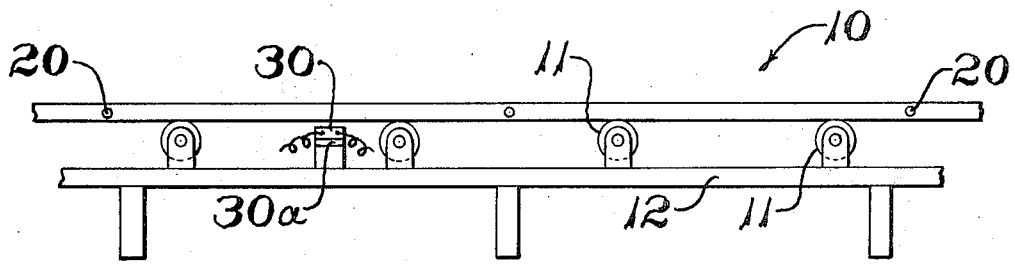
FIG. 2 is a side elevation view of the belt installation of FIG. 1 and shows the signal generator transmitter plate positioned closely adjacent the undersurface of the load-carrying span of the belt.
Figure 3:
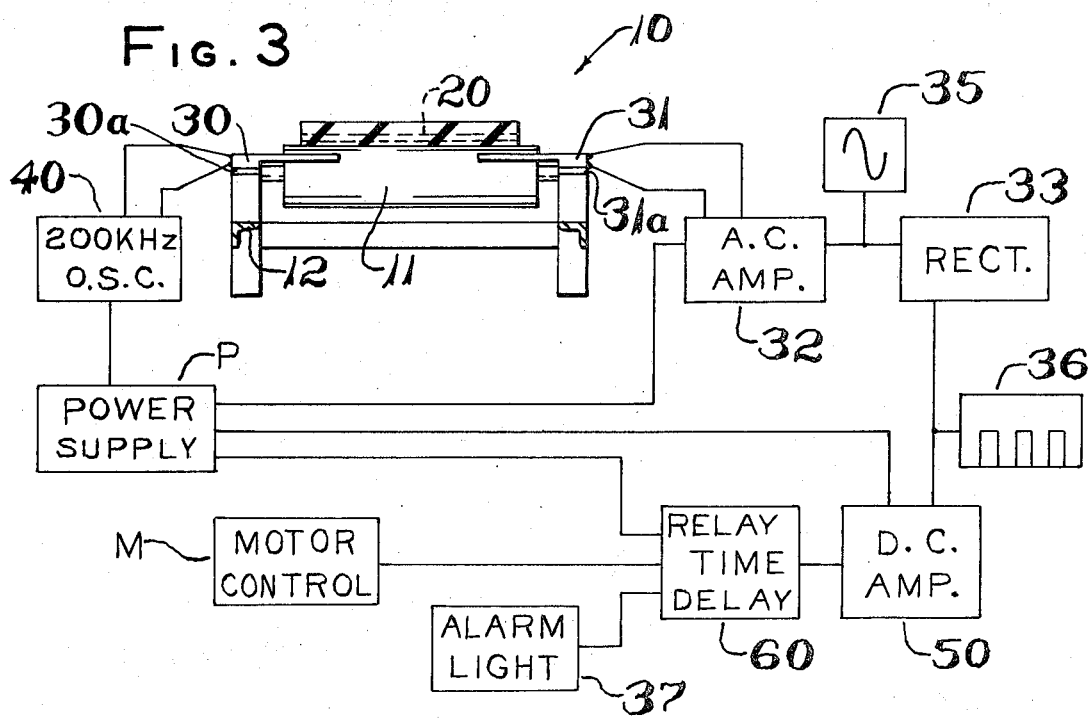
FIG. 3 is a section view of the conveyor installation of FIG. 1 taken along section indicating line 3—3 of FIG. 1 adjacent the signal generator transmitter plate and detector plates, and shows, in schematic representation, the electrical connection of the signal generator and the detector circuits to the transmitter and detector plates.

Referring now to FIGS. 1, 2 and 3, a signal transmitting plate 30 is mounted at a fixed stationary location along one edge of the belt. In the presently preferred practice of the invention, the plate 30 is electrically insulated from the structure supporting the rollers by an insulator 30a. The plate 30 is spaced closely adjacent the undersurface of the belt in parallel relationship thereto. The plate 30 has connected thereto a signal source generator 40, as, for example, an oscillator which provides a signal to the plate 30. In the presently preferred practice of the invention, the signal generator is a relaxation oscillator of the R-C type made by adding external resistors and capacitors to a Motorola MC1539L integrated circuit amplifier generating a signal of preferably 200 KHz.

However, other types of signal generators may be used, as, for example, a packaged crystal oscillator. Furthermore, the frequency of the generated signal is not limited to the preferred value, but may be in the range 100–500 KHz. A power supply P is provided for the oscillator 40 and other circuitry components. The presently used power supply is a "Ferrotran" Model SU30A which is unregulated and the output thereof is regulated by a "Fairchild" Model U6A7723312 voltage regulator.

As each of the conductors 20 passes by the signal transmitter plate 30, the signal from the oscillator 40 is capacitively applied to conductor 20. A detector plate 31, also electrically insulated from the roller support structure by an insulator 31a, is provided along the longitudinal edge of the belt opposite that of the signal transmitter plate 30 and the detector plate is preferably located at the same longitudinal station as the signal transmitter plate. The detector 31 is also disposed in closely spaced parallel relationship to the undersurface of the belt for capacitive coupling with the conductors 20. The plate 31 is connected electrically to an A.C. amplifier 32 which amplifies the signal detected by the detector plate. In the presently preferred practice of the invention, the amplifier is a Motorola MC1539L integrated circuit amplifier; however, any other suitable high-reliability amplifier may be used. The amplified signal 35 from the amplifier 32 is then fed to a rectifier 33, including a filter (not illustrated), which converts the amplified alternating 200 KHz signal from the A.C. amplifier 32 into a series of direct current pulses 36, as illustrated in FIG. 3. The rectified D.C. pulses are then applied to a D.C. amplifier 50. In the presently preferred practice of the invention, the rectifier 33 is a 1N4002 diode for reliability; however, any convenient and suitable rectifier may be used. The rectified D.C. pulses 36 are then amplified by a D.C. amplifier 50. The D.C. amplifier 50, employed in the present practice of the invention, is a "Fairchild" Model U6A771312 and is an integrated circuit type amplifier for reliability. However, other types of amplifiers may be used if desired. In the present practice of the invention, the overall signal gain measured across both A.C. amplifier 32 and D.C. amplifier 50 is of the order of 1,000 to provide a useful signal voltage level.

The amplified D.C. pulses 36 are then applied to a delay means 60, as, for example, a relay which is held in the closed or operative position as long as the pulses are received from the detector plate at intervals not exceeding a predetermined time limit. In the presently preferred practice of the invention, the relay has a delay built in such that failure of the signal from the detector plate will not deactivate the relay during the time interval elapsing between passage of any two successive unbroken conductors over the detector plate. However, if a broken conductor passes over the detector plate and fails to transfer a signal thereto, the lapse of time from the previous conductor to the next operative conductor will be sufficient that the relay will deactivate. The time-delay relay used in the present practice of the invention is a Potter-Brumfield Model CDD-38-30012 and is preferably set for a predetermined time of substantially 1.5 times the time interval elapsing between passage of adjacent conductors in the belt. However, if desired, a longer time delay may be used for permitting passage of more than one broken conductor. The relay 60 is connected to a control M for the conveyor belt drive mechanism which control stops the conveyor when the relay is deactivated. If desired, the relay 60 may also be connected to activate an alarm light 37.

In operation, passage of each of the conductors 20 past the transmitter plate 30 and detector plates 31 will cause repeated transmission of the signal from the generator to the relay, with lapses between signals never exceeding the length of time corresponding to the passage of each successive conductor. However, should one of the conductors be damaged or severed by a rip in the belt, the lapse of time caused by the broken conductor failing to transmit a signal to the relay will thus deactivate the relay and shut down the conveyor belt mechanism and turn on the alarm light.

Figure 4:
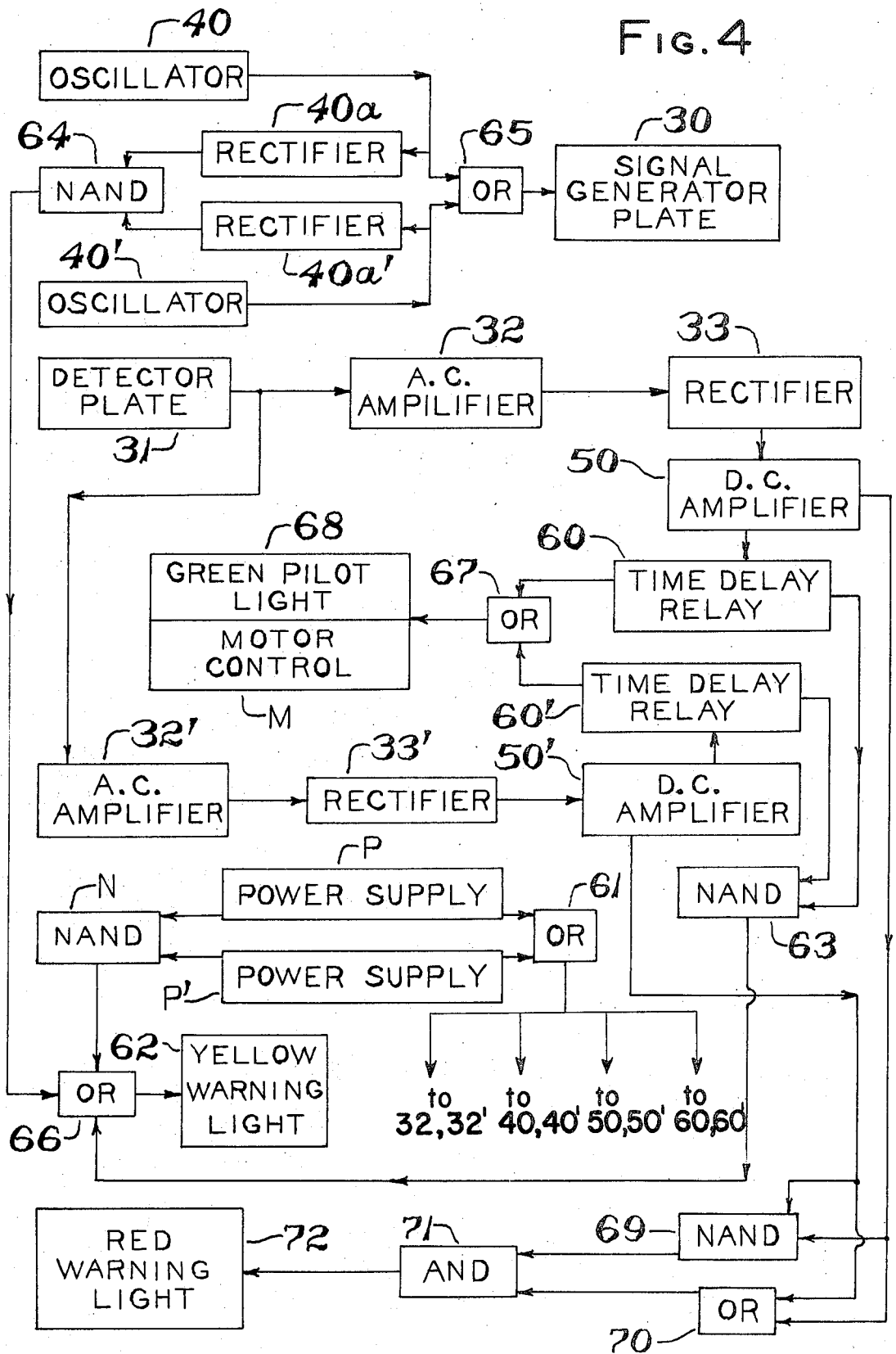
FIG. 4 is a logic block diagram of an alternate circuit arrangement utilizing two complete circuits for increased reliability.

Referring now to FIG. 4, a dual component system is illustrated in a block diagram. This system of FIG. 4 has greater reliability under severe service conditions and is so designed that the system will continue to function in the event of component failure in either of two circuits. Each of the two circuits provided in the system of FIG. 4 operates in the same manner and with the same components as the system of FIG. 3, and, therefore, common reference numerals are used where appropriate to designate like parts of identical function with the same numerals primed being used to denote duplicate components. Logic devices are provided and used to detect a failure in either circuit, which devices are denoted in FIG. 4 by NAND for a circuit element device having two inputs giving an output when neither or either of its two inputs is on and no output when both inputs are on. The OR notation in FIG. 4 denotes a circuit element having multiple inputs and giving an output when any, some and all inputs are on and giving no output when none are on. The notation AND in FIG. 4 is used to denote a device having two inputs and giving an output only when both inputs are on.

In the circuit arrangement of FIG. 4, two power supplies P and P' are provided with the ututs of each connected to an OR device 61, the output of which supplies duplicate AC amplifiers 32 and 32', duplicate DC amplifiers 50 and 50', duplicate time delay relay 60 and 60' and duplicate oscillators 40 and 40'. Failure of either power supply P or P' causes OR 61 to permit the remaining operational power supply to continue to power the system components while isolating the inoperative supply therefrom. Failure of both power supplies causes OR 61 to isolate both power supplies from the remaining circuitry. The output of the oscillators 40,40'40' are applied to an OR 65, the output of which is applied to the signal transmitter plate 30 for sequentially inducing a signal in the conductors 20 embedded in the belt. The signal from oscillators 40, 40' is also applied to the inputs of a NAND device 64 through respectively intermediate rectifiers 40a,40a'. The output of NAND 64 is applied to an OR device 66 whose output operates a preferably yellow warning light 62. The output of power supplies P,P' is also applied to the inputs of a NAND device N, the output of which is applied to one of the inputs of the OR device 66. The signal output of the time delay relays 60,60' are also applied respectively to the inputs of a NAND device 63, the output of which is also applied to the OR device 66. Thus, an open-circuit failure of any of the oscillators 40,40', power supplies P,P', or time delay relays 60,60', causes respectively the corresponding NAND devices 64, N or 63 to be turned on, and the yellow light 62 comes on indicating a component failure, yet the overall system is permitted to continue operation.

The signal outputs of the time delay relays 60,60' are connected respectively to the inputs of an OR device 67, the output of which is connected to the control M for conveyor drive and to a green pilot light 68. In normal operation, a signal will be received from relays 60,60' so that the conveyor belt motor and green light will remain energized. In addition, provision is made for a warning signal in the event of a short circuit failure resulting in a continuous output from any of the amplifiers. In order to provide such a warning, a NAND device 69 is provided with the inputs thereof receiving respectively the output signal of D.C. amplifiers 50,50', which amplifier outputs are simultaneously applied to respectively the inputs of an OR device 70. The outputs of the NAND 69 and OR 70 are respectively then applied to the inputs of an AND device 71, the output of which operates a red warning light 72 in the event a signal is received from both of the devices 69 and 70, thereby indicating a short circuit.

The NAND, OR and AND devices are conventional and hence are not described or illustrated in detail. In the presently preferred practice, a Texas Instrument SN5400N integrated circuit is employed for each NAND device; two Motorola 1N4002 diodes are employed, one for each OR device; and a Motorola MC3101L integrated circuit is utilized for each AND device.

The present invention thus provides a unique means for providing early detection of a rip in a conveyor belt by employing spaced single-wire conductors embedded in the belt, with a signal generator capacitively inducing a signal in each of the conductors as they pass by. Loss of the induced signal upon passage of a broken conductor is detected and the detector is operative to deactivate the conveyor drive mechanism and/or actuate an alarm.

Modifications and variations in the present invention will be apparent to those having ordinary skill in the art and the invention is limited only by the following claims.

I claim:
1. A conveyor belt rip detector comprising:
   a. an endless non-metallic conveyor belt;
   b. a plurality of longitudinally spaced electrical conductors embedded in and extending transversely of the belt with each conductor comprising an unbroken length of electrically conductive material having the opposite ends thereof disposed respectively adjacent the opposite edges of the belt;
   c. electrical circuit means external of said belt including a source of oscillatory electrical energy and stationary means including a pair of spaced metallic plates disposed respectively adjacent opposite inner peripheral edge regions of the belt to sequentially capacitance couple the end regions of each conductor into the said electrical circuit during movement of the belt to thereby sequentially provide a flow of oscillatory electrical energy through each conductor when unbroken and while so coupled; and,
   d. means in said circuit operative to provide an indication of the reduced oscillatory energy flow in said circuit when an unbroken conductor is not coupled in said circuit;
   e. the last-mentioned means including means providing a time delay of duration greater than the interval of time required for two adjacent but less than the time for three adjacent conductors to successively be coupled into said circuit by movement of the belt whereby an indication is provided of a defect in said belt resulting in breakage of any of said conductors.

2. The conveyor belt rip detector defined in claim 1, wherein
   a. said belt is provided with drive mechanism including an electrically operated control means to effect stopping of said belt; and
   b. said control means is connected in said circuit means as a part of the said indicating means.

3. The conveyor belt rip detector defined in claim 2, wherein said circuit means includes:
   a. means for amplifying the oscillatory electrical energy detected in a coupled conductor;
   b. rectifying means connected to said amplifying means and operative to convert the amplified oscillatory energy to a series of direct current pulses; and,
   c. the said time delay means comprises relay means receiving said pulses and operative upon cessation of said pulses for a predetermined time to deactivate the conveyor drive control means.

4. The conveyor belt rip detector defined in claim 1, wherein said source of oscillatory electrical energy emits a signal having a frequency in the range 100–500 KHz.

5. The conveyor belt rip detector defined in claim 3, wherein
   a. said source of oscillatory electrical energy, amplifier means, rectifier means and time delay means are provided in duplicate with the duplicate components connected electrically in parallel; and
   b. electrical OR logic means connected to the output to each pair of said source of oscillatory energy means and said time delay means operative to provide circuit completion through the operative member of the duplicated means.

6. The conveyor belt rip detector defined in claim 5, further comprising alarm means receiving the outputs respectively of said sources of oscillatory energy means and said time delay relay means, said alarm means including electrical logic NAND means operative upon open circuit failure of any of the said means connected thereto to energize said signal means.

7. The conveyor belt rip detector defined in claim 6, wherein said signal means includes a warning light.

8. The conveyor belt rip detector defined in claim 3, wherein said rectifying means includes D.C. amplifying means.

9. The rip detector defined in claim 8, further comprising alarm means including NAND and OR logic means receiving the output of said D.C. amplifying means and connected to signal means through an AND logic means to energize said signal means only when a continuous output is received from one of said D.C. amplifying means.

10. The rip detector defined in claim 9, wherein said signal means includes a warning light.

* * * * *

UNITED STATES PATENT OFFICE
CERTIFICATE OF CORRECTION

Patent No. 3,792,459      Dated February 12, 1974

Inventor(s) Frank D. Snyder

It is certified that error appears in the above-identified patent and that said Letters Patent are hereby corrected as shown below:

Column 2, line 50, delete "9".

Signed and sealed this 11th day of June 1974.

(SEAL)
Attest:

EDWARD M. FLETCHER, JR.
Attesting Officer

C. MARSHALL DANN
Commissioner of Patents